United States Patent
Masui et al.

(10) Patent No.: US 7,325,137 B2
(45) Date of Patent: *Jan. 29, 2008

(54) APPARATUS AND METHOD FOR SECURELY REALIZING COOPERATIVE PROCESSING

(75) Inventors: Takanori Masui, Ebina (JP); Tatsuhiko Yokohama, Ebina (JP); Masanori Satake, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 952 days.

This patent is subject to a terminal disclaimer.

(21) Appl. No.: 10/653,219

(22) Filed: Sep. 3, 2003

(65) Prior Publication Data

US 2004/0194108 A1 Sep. 30, 2004

(30) Foreign Application Priority Data

Mar. 25, 2003 (JP) ............................. 2003-082323

(51) Int. Cl.
*H04L 9/00* (2006.01)
(52) U.S. Cl. ....................... 713/176; 713/181
(58) Field of Classification Search ...................... None
See application file for complete search history.

(56) References Cited

U.S. PATENT DOCUMENTS

| 4,725,946 A | * | 2/1988 | Prange et al. ............... 718/106 |
| 6,157,721 A | * | 12/2000 | Shear et al. ................. 380/255 |

FOREIGN PATENT DOCUMENTS

| JP | A 8-123744 | 5/1996 |
| JP | A 2001-282970 | 10/2001 |
| JP | A 2002-99686 | 4/2002 |
| JP | A 2002-353960 | 12/2002 |
| JP | A 2004-153472 | 5/2004 |
| JP | A 2005-217663 | 8/2005 |
| JP | A 2005-217663 | 11/2005 |

OTHER PUBLICATIONS

U.S. Appl. No. 11/401,090; filed Apr. 10, 2006; Takanori Masui.

* cited by examiner

*Primary Examiner*—Nasser Moazzami
*Assistant Examiner*—Brandon S Hoffman
(74) *Attorney, Agent, or Firm*—Oliff & Berridge, PLC

(57) ABSTRACT

A system which allows each server in a network to verify the signature of a party issuing a service instruction in a system for providing a cooperative service by allowing servers to send and receive instruction data indicating instructions to each server and to execute the instruction written in the instruction data. An instruction input device receiving an instruction from a service requestor attaches an electronic signature (initiator signature (74)) of the requestor or the instruction input device to an instruction which indicates process content of each server, to create a signed individual instruction (72). The instruction input device further attaches an initiator signature (76) to data in which the signed individual instructions (72) for all servers involved in the service are merged, to create a collective instruction (70). The collective instruction (70) is transmitted to a flow controller controlling the servers. The flow controller verifies the authenticity of the collective instruction (70) using the initiator signature (76). When the verification is successful, the flow controller transmits the signed individual instruction (72) corresponding to each server.

18 Claims, 8 Drawing Sheets

APPARATUS AND METHOD FOR SECURELY REALIZING COOPERATIVE PROCESSING

BACKGROUND OF THE INVENTION

1. Field of the Invention

The present invention relates to a technology for realizing various cooperative processes wherein various processors present on a network cooperate, and in particular to a security technology associated with cooperative processing.

2. Description of the Related Art

Workflow systems are currently being proposed in which various services can be provided for office functions by connecting to a LAN (Local Area Network) devices such as a scanner, a facsimile machine, a printer, a copier, and a multifunction device having these functions integrated so that these devices can communication with information processors such as personal computers or a mail server.

In recent years, technologies allowing various web applications to cooperate with one other have been proposed. It is highly expected that, if an overall system can be constructed by connecting various application services and service providers accessible through the Internet and provided, the cost for developing a system can be significantly reduced because existing services can be utilized. In connection with this, languages such as XML (eXtensible Markup Language) or the like also are attracting attention as a common platform enabling such cooperative services.

Examples of conventional workflow systems include those disclosed in, for example, Japanese Patent Laid-Open Publication Nos. Hei 8-123744, 2002-99686, and 2001-282970. An example of conventional art references that disclose an electronic signature is Japanese Patent Laid-Open Publication No. 2002-353960, which does not otherwise relate to a workflow as described above. Japanese Patent Laid-Open Publication No. 2002-353960 discloses a computer system for securely executing a program code which allows a multi-task execution of verification and decryption processes of a signature by electronically signing each of the smallest units of memory assignment of an encoded program code.

A service forming the "flow" (the flow of work processes or operations) can be requested from an associated processor by sending some form of instruction data to the processor. When there is a possibility that the instruction data maybe falsified or spoofed, there may be cases in which the security level required by the processor cannot be satisfied.

In order to prevent such falsification or the like of data, an electronic signature system of PKI (Public Key Infrastructure) is now commonly employed. However, in a cooperative service such as a workflow, a simple electronic signature technology may not be sufficient for a processor to determine whether or not received instruction data is identical to the instruction sent by the requestor of the cooperative service. Although a system in which a processor applies a specific process to the received instruction data and transmit the processed data to the next processor is theoretically possible such a system is problematic in that the electronic signature originally attached to the instruction data by the service requestor may be lost or damaged by some of the processes applied during the flow.

SUMMARY OF THE INVENTION

According to one aspect of the present invention, there is provided an information processor for realizing a service by allowing a plurality of job processors, each executing a process according to a process description written in instruction data, to cooperatively operate, the information processor comprising a signature unit for electronically signing a portion of the process description written in the instruction data which is to be executed by the job processor; and a transmission unit for transmitting the instruction data electronically signed by the signature unit to a job processor for executing a process indicated in the process description.

According to another aspect of the present invention, it is preferable that, in the information processor, the signature unit attaches an electronic signature of a requester who requested the service. According to another aspect of the present invention, it is preferable that, in the information processor, the signature unit attaches an electronic signature of the information processor.

According to another aspect of the present invention, it is preferable that the information processor is the originating unit issuing the service. An instruction input device described with reference to preferred embodiments of the present invention is an example of this originating device.

According to another aspect of the present invention, it is preferable that the information processor is a relaying device for relaying between a job processor and another to transfer a result of a job process. A flow controller described with reference to preferred embodiments of the present invention is an example of this relaying device.

According to another aspect of the present invention, it is preferable that in the information processor, the signature unit signs data including the process description to be electronically signed, and the process descriptions for processes which are to be executed after the target process.

DESCRIPTION OF PREFERRED EMBODIMENTS

Figure 1:
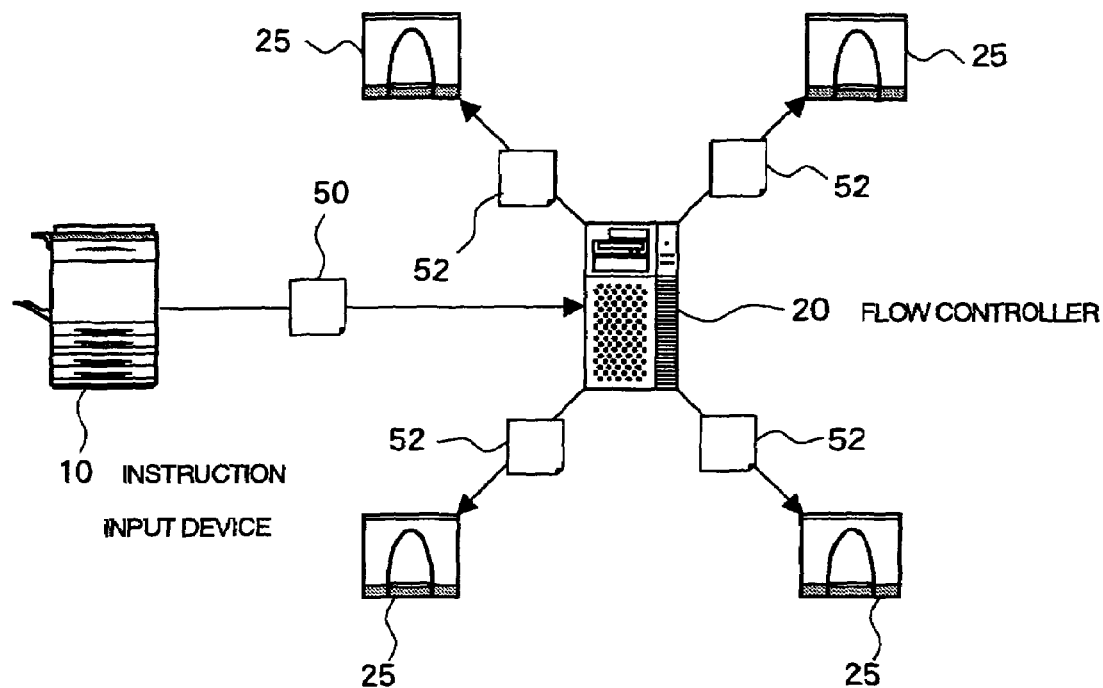
FIG. 1 is a diagram showing an example of a system configuration for providing a cooperative service.

Preferred embodiments of the present invention will now be described referring to the drawings.

FIG. 1 is a diagram showing an example system structure pattern of a service providing system according to a first preferred embodiment of the present invention. As shown in FIG. 1, this system includes an instruction input device 10, a flow controller 20, and a plurality of application servers 25.

An application server 25 is a server which provides a predetermined processing service in response to a request from another device. Examples of such a server 25 include, for example, a document database server, a mail server, and an image processing server for applying processes such as color conversion and rotation to image data. The server 25 provides these processing services in the form of, for example, a web application service.

This system can provide a cooperative service in which the processes of the plurality of servers 25 cooperate with each other such as, for example, one server 25 searching for a particular document and another server 25 transmitting the searched document in a form of an electronic mail.

The instruction input device 10 is a device for inputting a processing instruction of a user to the system. A user can input, into the instruction input device 10, execution instructions of cooperative services as described above. The instruction input device 10 can be constructed by, for example, incorporating into a personal computer a user interface program for receiving instructions to the system by a user. It is, however, preferable that, in consideration of document processing services in offices and workplaces, a digital multifunction device be used as the instruction input device 10 which includes a function to read a paper document and convert the paper document into electronic data, in addition to the information processing function and the communication function. A digital multifunction device is a device which can perform a plurality of functions of a scanner, a printer, a copier, a facsimile, network communication, and the like.

A flow controller 20 requests a process to each of the servers 25 to realize a cooperative service in which the services provided by the individual servers 25 are cooperated.

Preferably, the instruction input device 10, the flow controller 20, and the servers 25 are compatible with a public key encryption system and each has a private key and a public key of its own. In addition, each of the instruction input device 10, flow controller 20, and servers 25 either has public keys of the other devices 10 and 20 and servers 25 or can, as necessary, obtain these public keys from a certificate authority connected to the network.

In the system shown in FIG. 1, when a user inputs a cooperative service execution instruction to the instruction input device 10, the instruction input device 10 transmits data indicating the content of the instruction. This data will hereinafter be referred to as a "job flow instruction" 50. The job flow instruction 50 contains a description of the processes of all servers 25 related to the cooperative service and information on the order of execution of the processes. The flow controller 20 receiving the job flow instruction 50 controls each of the servers 25 in accordance with the instruction 50 to realize the cooperative service indicated in the instruction 50.

In this process, the flow controller 20 creates an instruction 52 for each server 25 (data indicating the content of the instruction) based on the received job flow instruction 50 and forwards the instruction 52 to the servers 25 to realize a cooperative operation of the servers 25. More specifically, the flow controller 20 transmits an instruction 52 to a server 25 which is to be operated next according to the description of the job flow instruction 50, and, when a notification of completion of process (and, in some cases, data resulting from the process) is returned from the server 25 in response to the transmitted instruction 52, transmits an instruction 52 to the next server 25, that is, the server 25 for executing the next process step.

As described, the system shown in FIG. 1 employs a system configuration commonly known as a "star-type" system in which a group of servers 25 cooperate under the control of the flow controller 20.

Figure 2:
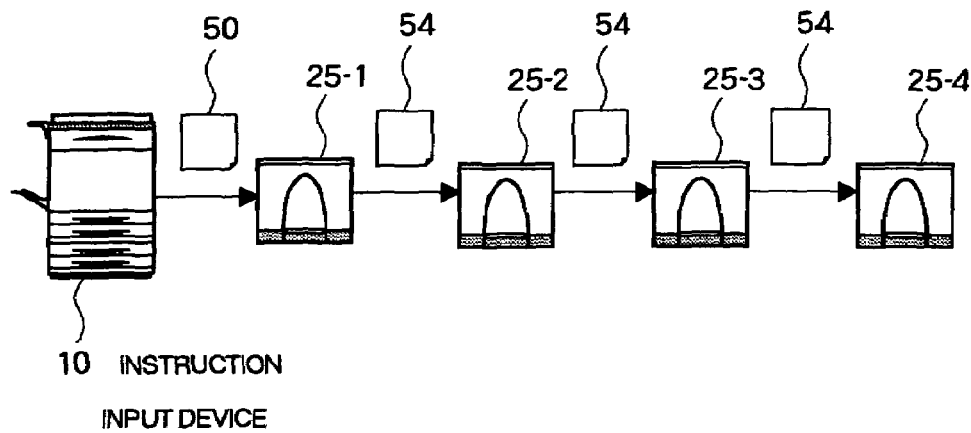
FIG. 2 is a diagram showing another example system configuration for providing a cooperative service.

Next, referring to FIG. 2, another example system configuration pattern of a service providing system according to a preferred embodiment of the present invention will be described. In FIG. 2, the elements equivalent to those in the system shown in FIG. 1 will be assigned the same reference numerals and will not be described again.

This system comprises an instruction input device 10 and a plurality of application servers 25.

While the system of FIG. 1 has a flow controller 20 for controlling cooperation, the system of FIG. 2 does not have such a central controller, and each application server 25 executes a control operation for the cooperative operation. With this structure, the instruction input device 10 creates a job flow instruction 50 indicating a process each server 25 is to execute for cooperative service instructed by the user and transmits the job flow instruction 50 to the servers 25 for execution of the processes.

The configuration of FIG. 2 is commonly known as a "daisy-chain" type in which the servers 25 for processes forming the cooperative service are arranged in sequence in the order of the processes. In this configuration, when the instruction input device 10 transmits an instruction 50 to a first server 25-1 in the server chain, this triggers a service process to be started. When the process of the server 25-1 is completed, a process of the next server 25-2 is started. Likewise, when the process of the server 25-2 is completed, a process of the next server 25-3 is started and so on, so that the processes of servers 25 are cooperated. In this structure, an instruction 54 is directly transmitted from the instruction input device 10 to the server 25 or is transmitted from the previous server 25 to the server 25. Each of the servers 25 executes a process according to the instruction and transmits an instruction for starting a process or instruction data 54 to the next server 25 indicated in the instruction. In this manner, a cooperative service can be realized (the details will be described later).

Two systems for cooperation of servers 25 have been described, a star-type configuration in which a flow controller 20 controls from a center, and a daisy-chain type configuration in which each server 25 sends the process to the next server 25.

Two types instructions 52 and 54 to be transmitted to the servers 25 for cooperative service will next be described.

The first configuration is one in which to each server 25 involved in the cooperative service is transmitted an instruction 52 or 54 containing not only an instruction for the individual server 25 (description of the process content of the server 25), but also instructions for the other servers 25. One example of this configuration is a system wherein instruction data including instructions to all servers 25 involved in the cooperative service is sent to each server 25. A set of instruction data having a form that contains instructions to other servers 25 will hereinafter be referred to as a "collective instruction".

The second configuration is one in which an instruction 52 or 54 containing only an instruction for a server 25 and not instructions for other servers 25 is transmitted to each server 25 involved in the cooperative service. Such instruction data containing only an instruction to the server 25 will hereinafter be referred to as an "individual instruction".

By combining these two types of instructions 52 or 54 and two types of system structures described above, several transmission configurations can be obtained as a transmission form of the instruction to each server 25. As representatives of these various transmission forms, the following two instruction transmission forms can be considered.

Figure 3:
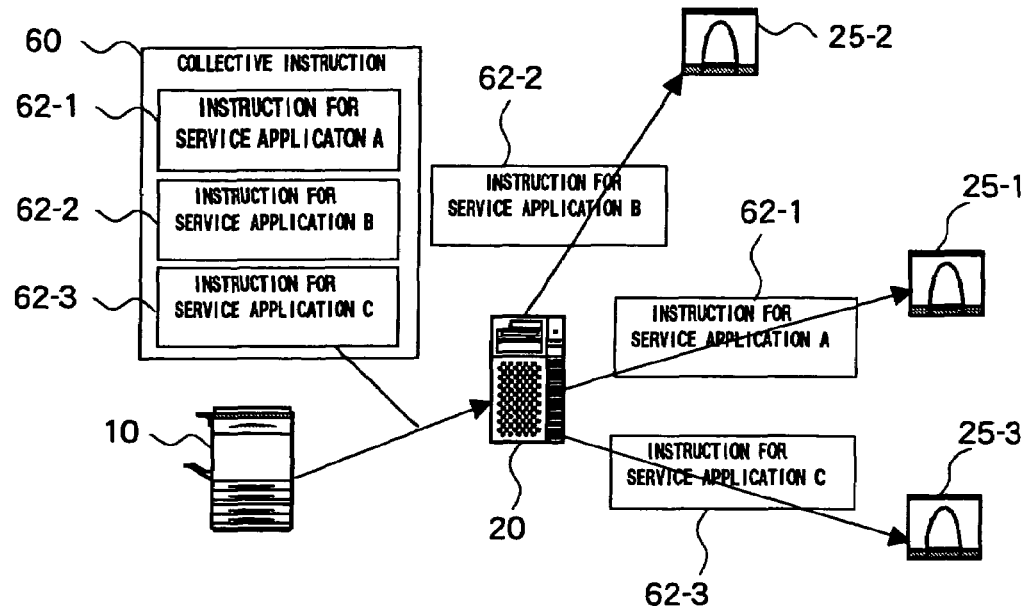
FIG. 3 is an explanatory diagram showing a first form of an instruction to each server in a cooperative service.

The first is an instruction transmission form in a star-type system shown in FIG. 3.

In this instruction transmission configuration, first, a collective instruction 60 containing individual instructions 62-1, 62-2, and 62-3 for all servers 25-1, 25-2, and 25-3 used in the requested service is transmitted from an instruction input device 10 to the flow controller 20. In one embodiment, the collective instruction 60 contains the individual instructions 62-1, 62-2, and 62-3 in the order of execution. The flow controller 20 extracts each individual instruction 62-1, 62-2, and 62-3 from the received collective instruction 60, and transmits the individual instructions to the corresponding servers 25-1, 25-2, and 25-3 at an appropriate timing.

A second example of an instruction transmission configuration is a configuration in which a collective instruction is applied to a daisy-chain type system. One example structure of this configuration is shown in FIG. 4.

Figure 4:
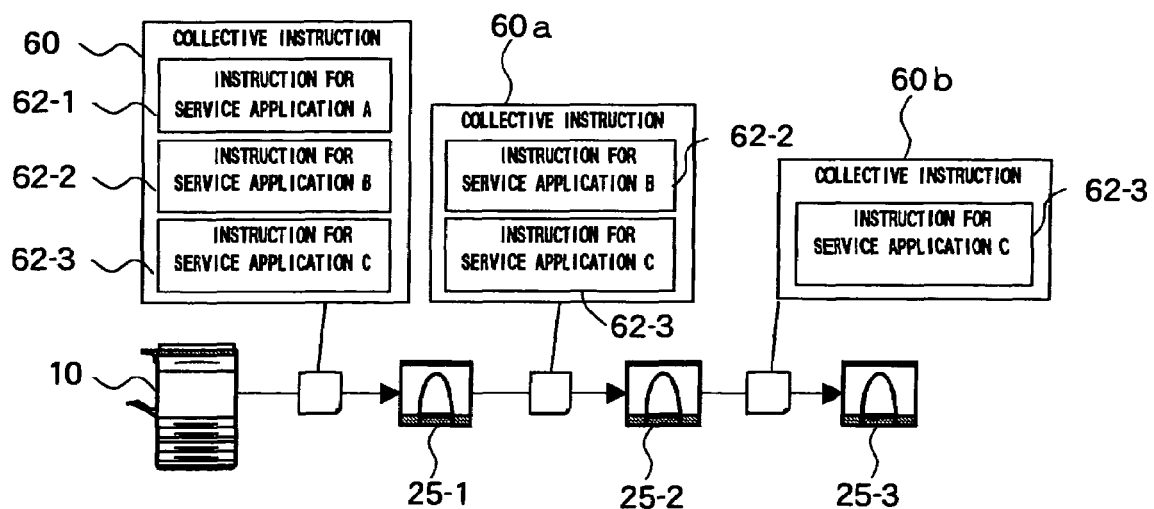
FIG. 4 is an explanatory diagram showing a second form of an instruction to each server in a cooperative service.

In the configuration of FIG. 4, first, a collective instruction 60 containing individual instructions 62-1, 62-2, and 62-3 for all servers 25-1, 25-2, and 25-3 to be used for the service is transmitted from the instruction input device 10 to the first server 25-1 in the flow. The server 25-1 receiving the collective instruction 60 identifies the individual instruction 62-1 directed to the server 25-1 from the collective instruction 60 and executes a process according to the individual instruction 62-1. The server 25-1 deletes the individual instruction 62-1 directed to the server 25-1 from the collective instruction 60 to create a new collective instruction 60*a* and transmits the newly created collective instruction 60*a* to the next server 25-2 in the flow. The collective instruction 60 contains a description of the server associated with the next process in the work flow. The server 25-2 receiving the collective instruction 60*a* operates in a similar manner, deletes the individual instruction 62-2 directed to the server 25-2 from the collective instruction 60*a* to create a collective instruction 60*b*, and sends the created collective instruction 60*b* to the next server 25-3. In this manner, in this second instruction transmission configuration, each server 25 sequentially deletes the individual instruction 62 directed to its own device from the collective instruction 60 and transmits the resulting collective instruction to the next server 25.

In both the first and second instruction transmission configurations as described above, when a user instructs an execution of a cooperative service to the instruction input device 10, it is possible to electronically sign the data of the created collective instruction 60 using a private key of the user or of the instruction input device 10. Because of this, the flow controller 20 or the first server 25-1 which directly receives the collective instruction 60 can check the presence/absence of falsification in the instruction 60 through signature verification. The electronic signature created using the private key of the user requesting the service and the electronic signature created using the private key of the instruction input device 10 used for inputting the request in the described manner will hereinafter be called an "initiator" signature and the user and the instruction input device 10 will hereinafter be referred to as an "initiator". Whether the electronic signature of the user is requested or the electronic signature of the instruction input device 10 is requested as the initiator signature depends on the system of the cooperative service and the security policies of the servers 25 cooperating in the system. According to the security policies of the site operating the present invention, there may be cases where both of the noted electronic signatures are attached as the initiator signature.

In contrast, when an individual instruction 62 directed to each server 25 or collective instructions 60*a* and 60*b* are created from the data of the collective instruction 60, the initiator signature attached to the original instruction 60 becomes invalid for the newly created instructions. Because of this, a server 25 receiving an instruction via the flow controller 20 or another server 25 cannot verify that the instruction is truly from the initiator.

A system in a preferred embodiment of the present invention for solving this problem associated with the initiator signature will now be described.

A basic concept of this system is that, when the instruction input device 10 creates a collective instruction 60, an initiator signature is attached individually to the individual instructions 62 for the servers 25 incorporated into the collective instruction 60.

A structure of a collective instruction preferable for the instruction transmission configuration of FIG. 3 according to this concept will now be described referring to FIG. 5.

Figure 5:
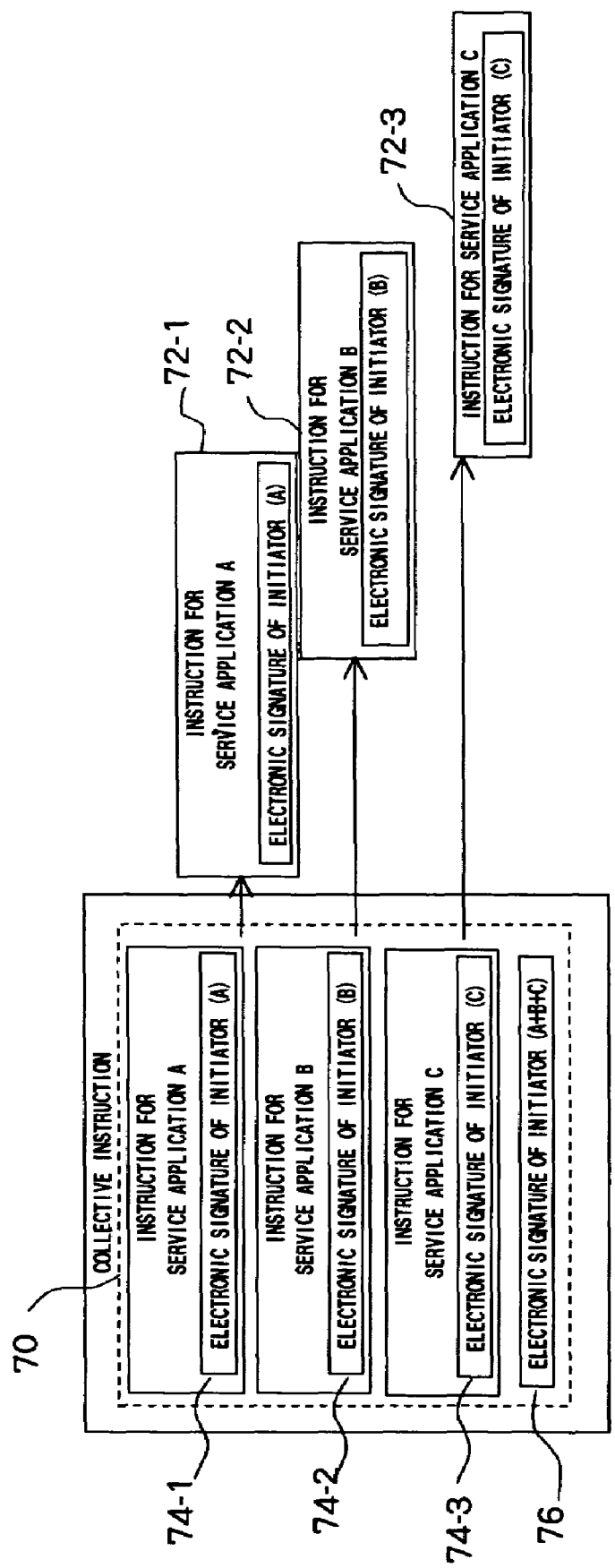
FIG. 5 is a schematic diagram showing one example data structure of a collective instruction to which an initiator signature is attached according to a preferred embodiment of the present invention.

A collective instruction 70 shown in FIG. 5 corresponds to a collective instruction 60 shown in FIGS. 3 and 4, and contains signed individual instructions 72-1, 72-2, and 72-3 for three servers 25-1, 25-2, and 25-3. The signed individual instructions 72-1, 72-2, and 72-3 are obtained by attaching initiator signatures 74-1, 74-2, and 74-3 to plaintext individual instructions 62-1, 62-2, and 62-3.

When this collective instruction 70 is used, the flow controller 20 extracts the signed individual instructions 72-1, 72-2, and 72-3 from the collective instruction 70 and transmits the individual instructions to the corresponding servers 25-1, 25-2, and 25-3. Each server 25 can confirm the authenticity or the like of the individual instruction 72 by verifying the initiator signature 74 contained in the received signed individual instruction 72.

The collective instruction 70 of FIG. 5 also contains an initiator signature 76 for the overall group of the signed individual instructions 72-1, 72-2, and 72-3. This overall initiator signature 76 is used by the flow controller 20 receiving the collective instruction 70 from the instruction input device 10 for verifying the authenticity or the like of the instruction 70. The overall initiator signature 76 is also effective for preventing abuse of each of the signed individual instructions 72-1, 72-2, and 72-3.

More specifically, in the configuration of the present embodiment, because an initiator signature 74 is attached to each individual instruction 72 contained in the collective instruction 70, there is a possibility that, for example, a third party may collect various collective instructions 70 through the Internet, extract the signed individual instructions 72 from the collective instructions 70, re-assemble the individual instructions 72 to create a new collective instruction, and make fraudulent use of that collective instruction. However, by attaching an initiator signature 76 for the overall group of signed individual instructions 72 contained in the collective instruction 70 as shown in FIG. 5, it is possible to prevent such fraudulent use, because a collective instruction created by fraudulent re-assembly can be detected by the flow controller 20 through signature verification.

There may be another method of attempting fraudulent use wherein a signed individual instruction 72 extracted from a collective instruction 70 is directly sent to the server 25. As a countermeasure to this method, it is possible to detect the fraud by a method wherein the flow controller 20 electronically signs the signed individual instruction 72 using a private key of the flow controller 20 itself and the server 25 verifies the electronic signature of the flow controller 20.

A specific example collective instruction 70 will now be described.

In this description, for illustrative purposes, a collective instruction is described for a cooperative service in which data of a first page is extracted from a document file read in the instruction input device 10 and having a plurality of pages and the extracted page is transmitted to a predetermined destination via an electronic mail. In addition, a star-type system shown in FIG. 3 is used as the system in which the collective instruction is employed in this description. In the system, a server 25-1 provides a service of page divider (a process to divide a document file into files each representing a page and to return a file of a requested page) and a server 25-2 provides an electronic mail transmission service. The server 25-1 has a host name of "pagedivider.foo.jp" and the server 25-2 has a host name of "mailsender.foo.jp". In the cooperative service shown in the instruction 70, a read process of a paper document is executed by the instruction input device 10, a first page is extracted at the server 25-1 from a document file created as the result of the read process, and an electronic mail containing a file of the first page is created and transmitted by the server 25-2 to a predetermined destination.

Figure 6:
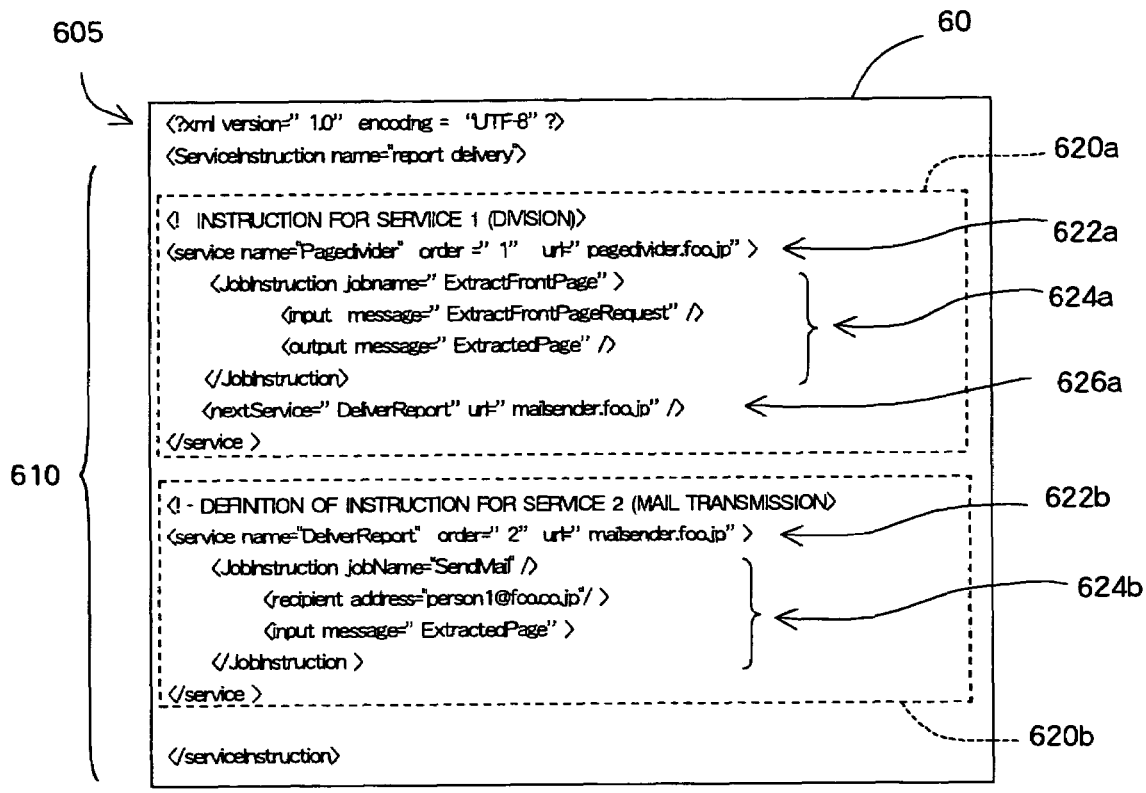
FIG. 6 is a diagram showing an example of a plaintext collective instruction.

A plaintext collective instruction 60 describing such cooperative service will look like that shown in FIG. 6.

The collective instruction 60 of FIG. 6 is described in XML (eXtendedMarkupLanguage). The collective instruction 60 contains a document element 605 which describes a version and a text code of the XML used in the instruction 60 and a document element 610 which indicates a cooperative service described by the instruction 60. A tag of the element 610 indicates the name of the cooperative service (name="report delivery"). The element 610 also describes individual instructions 620a and 620b for the servers 25-1 and 25-2 participating in the cooperative service.

A description 622a in the individual instruction 620a indicates the order of the process within the cooperative service (order="1") and the host name of the server 25-1 for executing the process (url="pagedivider.foo.jp"). On the first line of the description 624a, the name of the process to be used in this service (jobname="ExtractFrontPage") is indicated among various processes provided by the server 25-1. For example, the server 25-1 can execute various processes in addition to extracting a front page from a document file and create a file of the front page, such as, for example, dividing the document file into pages and creating a file for each page. The first line of the description 624a indicates a process to create a file for a front page of the document file among these various processes. Second and third lines of the description 624a indicate parameters for the process. The parameter shown on the second line indicates the file name of the input file for the process ("ExtractFrontPage") and the parameter shown on the third line indicates the file name of the output file of the process ("ExtractedPage"). When the instruction input device 10 assigns a file name of "ExtractFrontPage" to a document file representing a read document and transmits the file along with the instruction 60, the server 25-1 can recognize this file as a processing target.

In addition, the individual instruction 620a contains a description 626a which indicates the server 25-2 to apply a process after the process indicated in the instruction. The description 626a indicates the host name of the next server 25-2 (url="pagedivider.foo.jp").

Similar to the individual instruction 620a described above, the individual instruction 620b for the server 25-2 contains a description 622b indicating the order of the process and the host name of the server 25-2 and a description 624b indicating the name of the process the server 25-2 is to execute and the parameters for the process. Because the process to be executed by the server 25-2 in this example is transmission of electronic mail, the parameters include a destination address of the electronic mail (second line of the description 624b) and the name of the file attached to the electronic mail (third line of the description 624b). In this illustrated example, the name of the file to be attached is identical to the output file name of the process of the server 25-1.

In the illustrated example, because the server 25-2 executes the final process in the cooperative service indicated by the collective instruction 60, the individual instruction 620b does not contain a description indicating the server for performing the next process in the flow.

Figure 7:
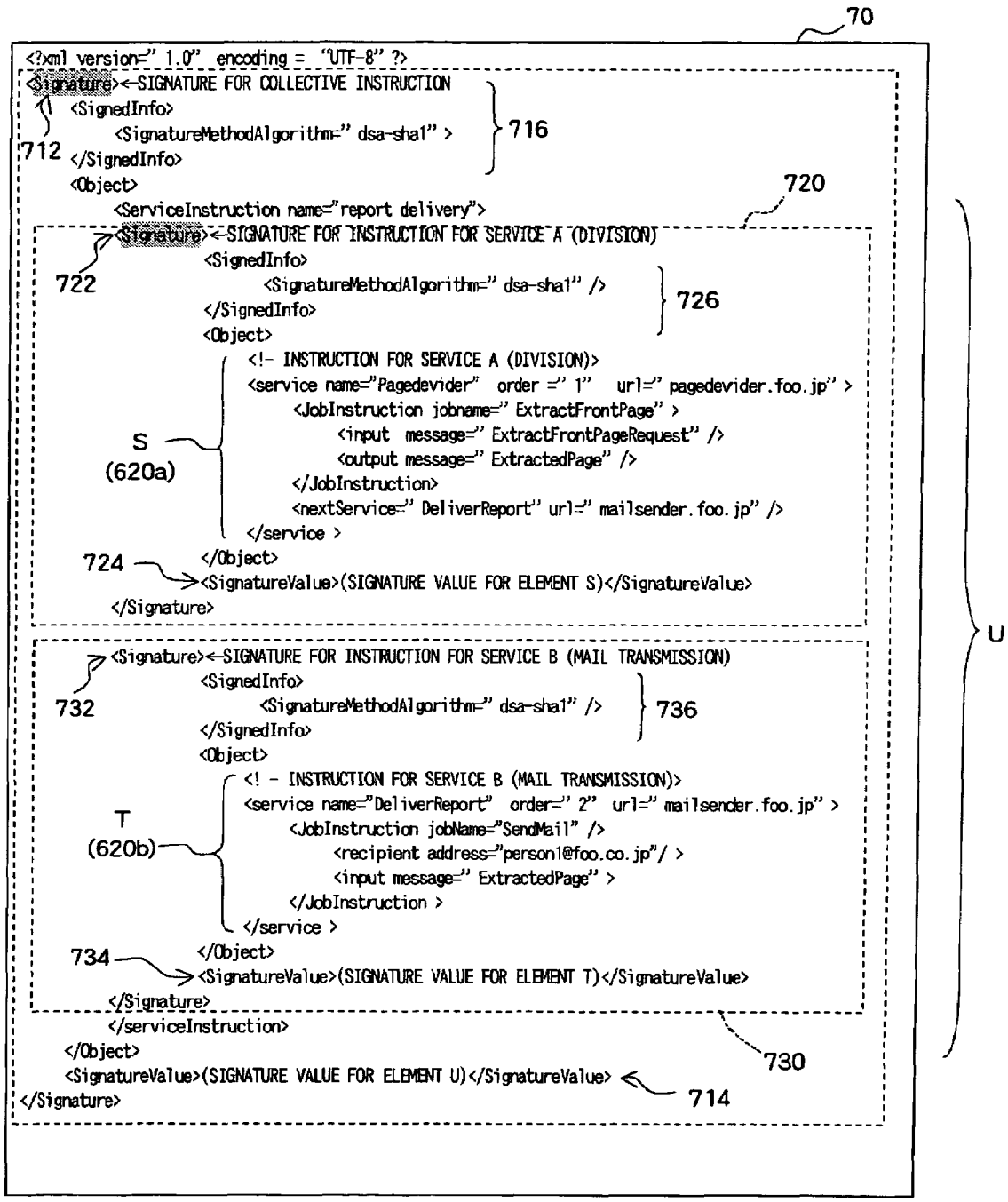
FIG. 7 is a diagram showing an example collective instruction to which an initiator signature is attached according to a preferred embodiment of the present invention.

In contrast to the plaintext collective instruction 60 as described above, a collective instruction 70 to which an initiator signature is attached according to the concept of FIG. 5 is shown in FIG. 7. FIG. 7 shows an example which has been simplified for the purpose of illustration.

In the example description of FIG. 7, a collective instruction 70 contains a signed individual instruction 720 for a server 25-1 and a signed individual instruction 730 for a server 25-2.

The signed individual instruction 720 directed to the server 25-1 is described as a signature element in an enveloping signature form indicated by a <Signature> tag 722. In the signature element, a signature information element 726 indicating information such as the algorithm used for the electronic signature is described. In the illustrated example, SHA-1 (RFC3174) is employed as the signature algorithm. Following the signature information element 726, a signature target element S sandwiched between an <object> tag and a </object> tag is written. The signature target element S has a description content identical to that of the individual instruction 620a of the plaintext collective instruction 60 (refer to FIG. 6). The element 724 is a signature value element indicating a signature value calculated by applying the designated signature algorithm to the signature target element S using the private key of the initiator. Although not shown in FIG. 7, the signed individual instruction 720 includes a key information element (indicated by a <KeyInfo> tag) indicating a public key corresponding to the private key used for calculating the signature value element 724. When the servers in the later steps are to verify the signature, the server obtains a public key corresponding to the signature key based on the information in the key information element and verify the signature using the obtained public key.

Similarly, a signed individual instruction 730 directed to the server 25-2 contains a signature information element 736, a signature target element T (individual instruction 620b), a signature value element 734 indicating the initiator signature value for the element T, and a key information element within a signature element indicated by a tag 732.

The overall collective instruction 70 is formed with an initiator signature attached to a signature target element U in which the two signed individual instructions 720 and 730 are merged. That is, the collective instruction 70 includes a signature information element 716, a signature target element U, a signature value element 714 indicating an initiator signature value for the element U, and key information element within a signature element indicated by a <Signature> tag 712.

A structure of a collective instruction preferable for the second instruction transmission configuration shown in FIG. 4 will now be described referring to FIG. 8.

Figure 8:
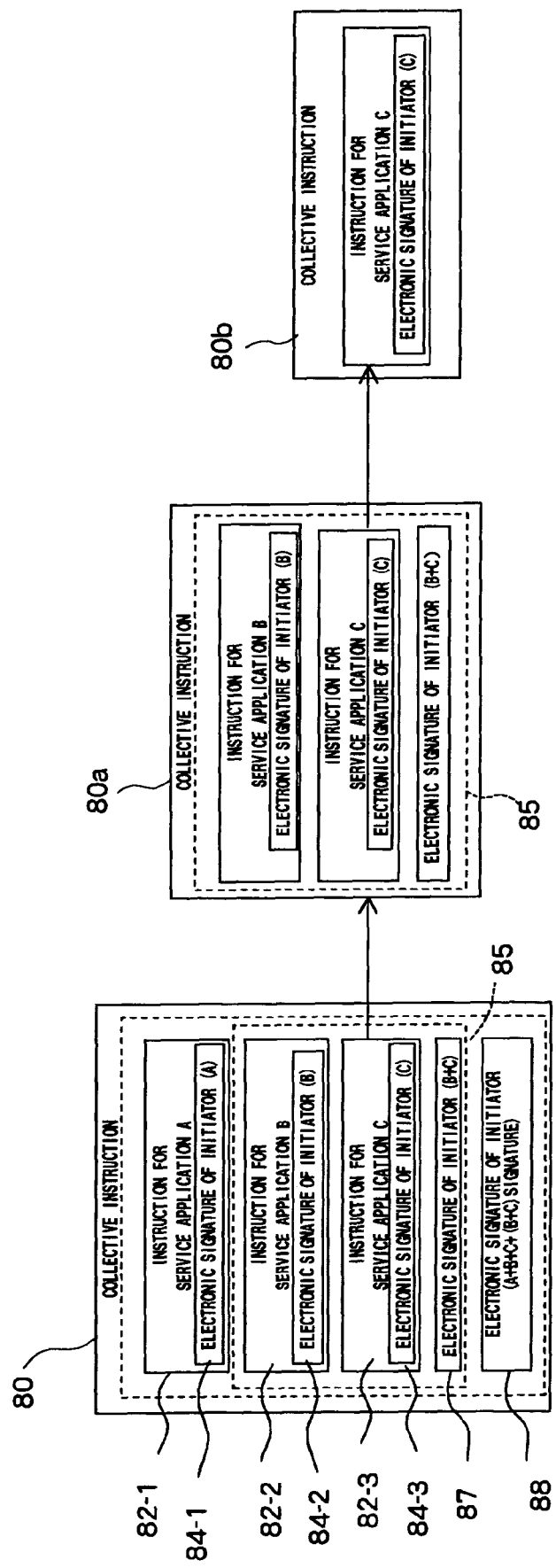
FIG. 8 is a schematic diagram showing another example data structure of a collective instruction created by an instruction input device.

In a collective instruction 80 of FIG. 8, respective initiator signatures 84-1, 84-2, and 84-3 are attached to the individual instructions 62-1, 62-2, and 62-3 to form signed individual instructions 82-1, 82-2, and 82-3. In addition, a block 85 is formed by attaching an initiator signature 87 to a description wherein the signed individual instruction 82-3 of the last process within the cooperative service and the signed individual instruction 82-2 of the process which is one process before the last process within the cooperative service are merged. Moreover, an initiator signature 88 is attached to a description wherein a signed individual instruction 82-1 which is one process before the block 85 (in the illustrated example, the first instruction) is merged with the block 85. The outermost initiator signature 88 corresponds to an initiator signature 76 for the overall collective instruction in the structure of FIG. 5.

A collective instruction 80 containing nested initiator signatures as described can be created by recursively applying a process "to merge the signed block and a signed instruction one before the signed block and to attach an initiator signature to the merged block", in an order opposite of the order of processes, to the signed individual instructions 82-1, 82-2, and 82-3. In other words, in this signing process, a signature is attached including a description of processes that are to be executed after the description of the process (that is, the individual instruction) which is the target for the electronic signature.

When a collective instruction 80 created by the instruction input device 10 as described is received by the first server 25-1, the server 25-1 first verifies the initiator signature 88 for the overall collective instruction 80. When the verification is successful, the server 25-1 searches for a signed individual instruction 82-1 directed to the server 25-1 and verifies the initiator signature 84-1 of the instruction 82-1. When this verification is also successful, the server 25-1 executes a process according to the description of the instruction 82-1 and creates a collective instruction 80a directed to the next server 25-2. The collective instruction 80a is created by removing, from the collective instruction 80, the signed individual instruction 82-1 directed to the server 25-1 and the outermost initiator signature 88 to extract a block 85 and attaching tags required for a collective instruction of the XML format. In other words, in the collective instruction 80a, the initiator signature 87 of the block 85 acts as the initiator signature for the overall collective instruction 80a.

Similarly, the server 25-2 receiving the collective instruction 80a verifies the initiator signature for the overall instruction 80a and verifies the initiator signature of the signed individual instruction 82-2 directed to the server 25-2, and, when these verifications are both successful, executes the process described in the instruction 82-2 and creates a collective instruction 80b directed to the next server 25-3. Similar to the above, the collective instruction 80b is created by removing, from the base collective instruction 80a, the signed individual instruction 82-2 and the outermost initiator signature 87 and adding tags or the like necessary for a collective instruction to the signed individual instruction 82-3 remaining after the removal.

When the server 25-3 receives the collective instruction 80b, the server 25-3 verifies the initiator signature on the signed individual instruction 82-3 contained in the collective instruction and directed to the server 25-3, and, when the verification is successful, executes a process described in the instruction 82-3. In this manner, a cooperative service corresponding to the collective instruction 80 is completed.

As described, with the collective instruction 80 of FIG. 8 having a nested structure, at any point between any two servers within the flow of the cooperative service, an initiator signature is always attached to the overall data block (that is, a group of instructions for a next server and subsequent servers) which forms the basis of the instruction to be sent from a server 25 to the next server 25. Thus, each server 25 can create a collective instruction for the next server 25 to which an initiator signature for the overall data is attached, by removing the individual instruction directed to the server 25 from the collective instruction received from a previous server 25.

Therefore, with the structure of the collective instruction 80 of FIG. 8, all collective instructions sent from a server 25 to a next server 25 contain an initiator signature for the overall collective instruction, and, thus, it is possible to prevent frauds such as a third party re-assembling a number of signed individual instructions 82 to form a collective instruction.

A specific example of a collective instruction 80 of FIG. 8 will now be described referring to FIG. 9.

Figure 9:
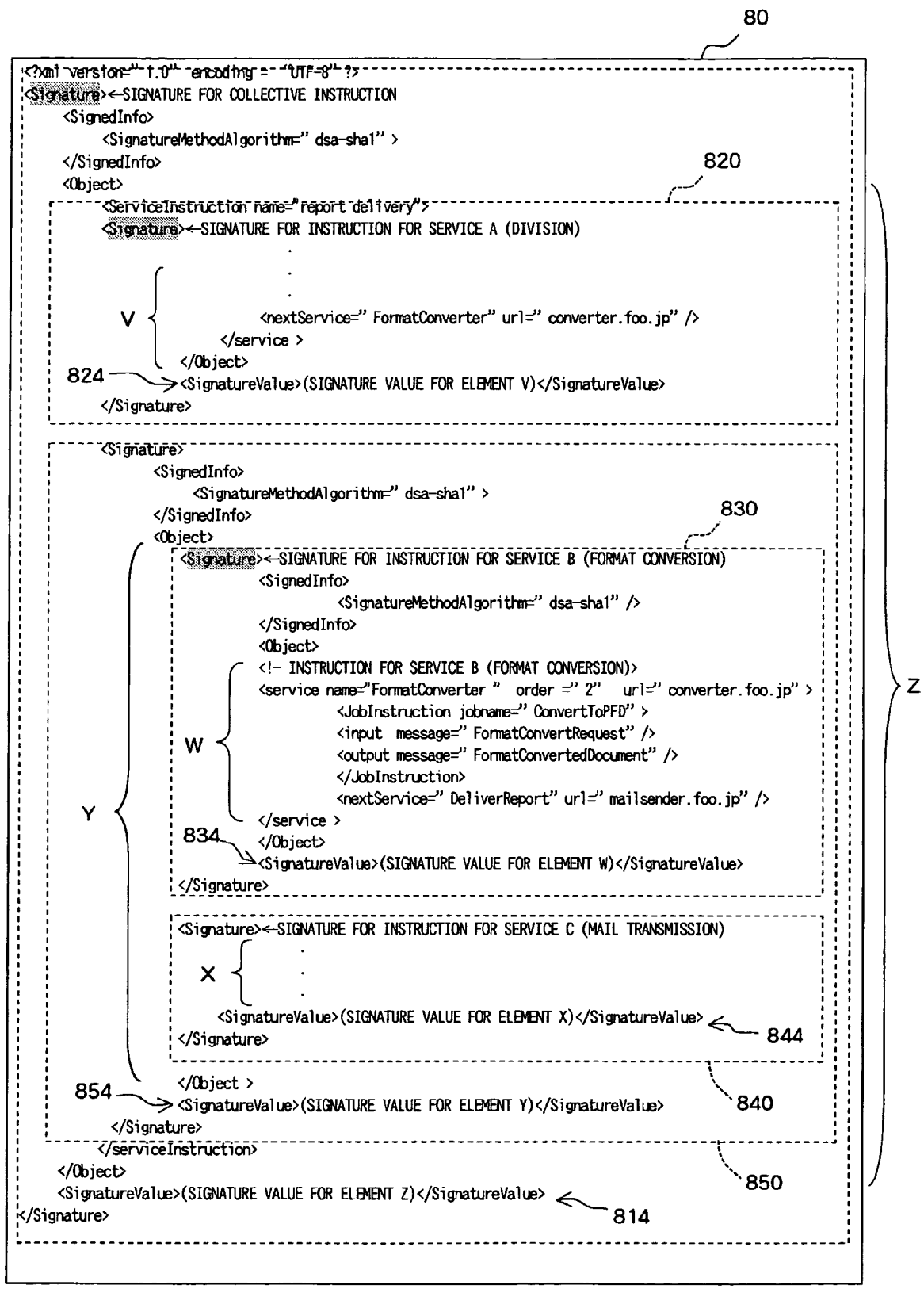
FIG. 9 is a diagram showing another example collective instruction to which an initiator signature is attached according to a preferred embodiment of the present invention.

The example shown in FIG. 9 represents a cooperative service comprising three services of extracting data of a first page from a document file having a plurality of pages read by the instruction input device 10 (service A), converting the extracted data into a predetermined file format (service B), and transmitting the file to a predetermined destination through an electronic mail (service C). Among these three services, the processes of the services A and C are identical to those of the page division and electronic mail transmission of FIGS. 6 and 7, and, thus, some portions of these services are not shown.

In the example of FIG. 9, with regard to signed individual instructions 820, 830, and 840, initiator signatures 824, 834, and 844 are attached to respective signature target elements V, W, and X. In addition, an initiator signature 854 is attached to a signature target element Y in which signed individual instructions 830 and 840 are merged. Finally, an initiator signature 814 is attached to a signature target element Z in which a signature element 850 made of the signature target element Y and the initiator signature 854 is merged with a previous signed individual instruction 820, to form the overall collective instruction 80.

The data structures of collective instructions 70 and 80 corresponding to the instruction transmission configurations of FIGS. 3 and 4 have been described. The description of the collective instructions 70 and 80 of FIGS. 7 and 9 are illustrated for the case wherein an enveloping signature form of an XML-signature (RFC3275) is employed. However, as is clear to a person with ordinary skill in the art, the method of these embodiments does not depend on the form of signature. In addition, the method of these embodiments do not depend on the data format of the instruction such as the XML.

The signature processes in preferred embodiments of the present invention have been described. Because these embodiments relate to an electronic signature for instructions, the embodiments have been described without any description of other aspects such as encryption. However, as is clear for a person with ordinary skill in the art, the signature process of these embodiments can be combined with an encryption process as necessary. For example, it is possible to apply an encryption process to each of the descriptions of process contents 624*a* and 624*b* of the individual instructions 620*a* and 620*b* (refer to FIG. 6) using a public key of the server which is the destination of these individual instructions and attach an initiator signature to the encrypted data to create signed individual instructions. Alternatively, it is also possible to apply an encryption process to the signed individual instruction using a public key of the destination server.

The structure and operation of the systems according to preferred embodiments of the present invention have been described. In these embodiments, in a first step, an initiator signature is individually attached to each of the individual instructions for servers cooperatively operating for the cooperative service. A "server" which is a unit for signature processing may be a virtual machine realized by a computer executing an application program describing a service process or may be a hardware device having one or a plurality of such application programs. With a software configuration, one individual instruction is formed of each description of the process for each application, whereas with a hardware configuration the individual instruction is formed of descriptions of processes for a plurality of applications contained in one hardware device, the descriptions arranged in the order of processes.

Figure 10:
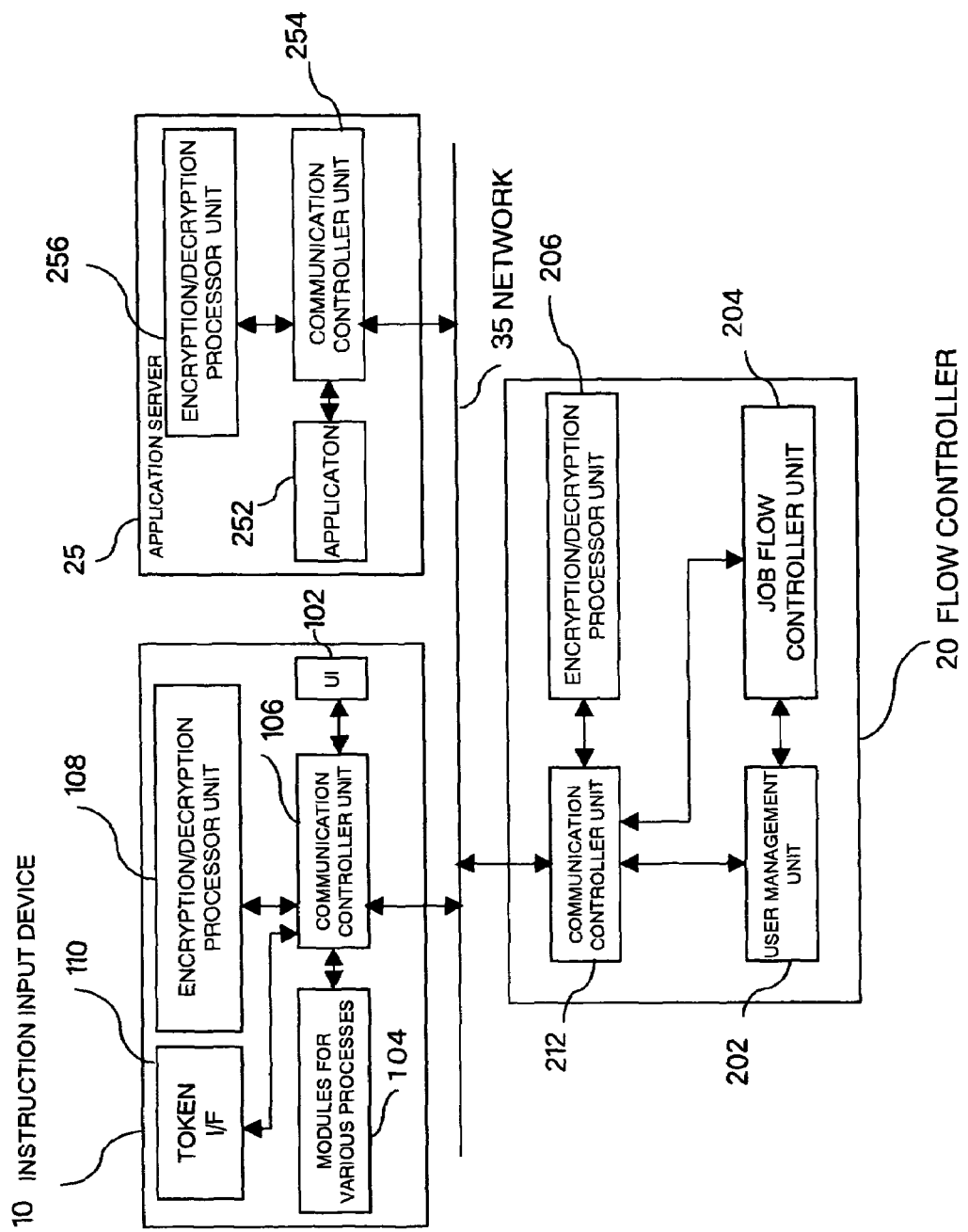
FIG. 10 is a diagram showing an example internal structure of each device forming a system for providing a cooperative service.

Example internal structures of the instruction input device 10, flow controller 20, and server 25 forming this system will now be described referring to FIG. 10.

First, the instruction input device 10 will be described. A UI (user interface) 102 of the instruction input device 10 is an user interface mechanism for displaying conditions of the instruction input device 10, an operation menu, and so on, and receiving selection and input of parameters from the user in response to the displayed information. The UI 102 may comprise, for example, a liquid crystal touch panel, a numeric keyboard, and various instruction buttons. A processing module 104 executes a service process provided to the user by the instruction input device 10. When the instruction input device 10 is a multifunction device, the processing module 104 includes function modules for realizing a scan function, a print function, a copy function, a facsimile transmission/reception function, etc. In this case, the processing module 104 is formed as a combination of hardware such as a scan engine, a print engine, and a facsimile device and a software for controlling each hardware. A communication controller unit 106 is a function module for performing various control processes for communication between the instruction input device 10 and other devices on a network 35 such as LAN.

An encryption/decryption processor unit 108 is a functional module for applying an encryption process to data to be transmitted from the instruction input device 10 to the network 35 and a decoding process to received encrypted data. In this embodiment, the encryption/decryption processor unit 108 is described as supporting a public key cryptosystem as an encryption system. This configuration, however, is for illustrative purpose only, and the encryption/decryption processor unit 108 may be based on other encryption methods, such as a symmetric key encryption method.

An example encryption process employed in the encryption/decryption processor unit 108 is a method wherein target document data is encrypted using a session key (symmetric key) generated by a random number or the like, the session key is encrypted using a public key of the destination device, and both encrypted data are transmitted to the destination. Upon receiving the encrypted data, the receiver device decodes the received data using its own private key to obtain the session key and decodes the encrypted document data using the session key. In the present specification, a description of "encryption using a public key" includes not only a processes in which the target data is encrypted using the public key, but also the described encryption process using a session key.

The encryption/decryption processor unit 108 also has a function to attach an electronic signature to data to be transmitted and a function to verify an electronic signature attached to received data. The electronic signature may be obtained by, for example, encrypting a massage digest calculated from the document data to be signed based on a predetermined digest method such as SHA-1 and MD5 (RFC1321) using a private key of the signing device. The verification of the electronic signature is performed by decoding the signature data using a public key of the signing device and judging whether or not the decoded result matches a message digest calculated from the signed document data based on the predetermined digest method. When these match, it is proved that the document data is truly from the signing device, and, at the same time, that the document data has not been falsified or tampered with.

An electronic signing process in the above-described embodiments is executed at the encryption/decryption processor unit 108.

The encryption/decryption processor unit 108 stores at least a public key of the flow controller 20. It is also preferable that the encryption/decryption processor unit 108 has a function to obtain a public key of each server or a user from a predetermined certificate authority or the like on the network as necessary. The encryption/decryption processor unit 108 also has a private key of the instruction input device 10 and can attach an electronic signature of the instruction input device 10.

A token I/F (interface) 110 is a mechanism for receiving a hardware token maintained by a user and for obtaining an electronic signature of the user using the private key of the user by communicating with the token. The hardware token is a small verification device carried by a user. When a public key encryption system is employed, for example, the hardware token includes a storage chip for storing data of the private key of the user, a calculation circuit for creating signature data by applying an encryption process to data to be signed using the user's private key, and an interface mechanism for inputting the signature target data and outputting signature data. The hardware token is formed as, for example, a contact type or non-contact type IC card, a device compatible with any of various wired interface standards such as the USB (Universal Serial Bus), and a device compatible with any of various wireless interface standards such as Bluetooth.

When the electronic signature of a user requesting a service is required as an initiator signature for a collective instruction, the initiator signature is attached to the collective instruction from the user's hardware token via the token I/F 110.

With this structure, when there is a need for the user to electronically sign data to be transmitted, the communication controller unit 106 creates a message digest of the data according to a system such as, for example, MD5 or SHA-1, and inputs the message digest to the hardware token mounted to the token I/F 110. The hardware token encrypts the input message digest using a stored private key of the user and returns the result of the encryption process (that is, the user's signature) to the communication controller unit 106. By the communication controller unit 106 attaching the user signature to the document data, an electronic signature of the user for the document data is attached.

In the above description, a configuration is described wherein the user's electronic signature is attached using a hardware token of the user. As an alternative configuration, it is also possible to store the user's private key in the instruction input device 10 in advance and attach the electronic signature of the user using the stored private key. With this configuration, in order to protect the private key of the user, a control in which the user is prompted to input verification information, such as a password or biometric data, only allows an electronic signature of the user to be attached when the user verification is successful. With a configuration using a hardware token, when a cooperative service requiring the user signature is executed, the user must, in a worst case scenario, wait until the cooperative service is completed in a state wherein the token is set in the instruction input device 10. With a configuration in which the private key is stored in the instruction input device 10, on the other hand, no such waiting is necessary. Conversely, the configuration using a hardware token has an advantage that a user can execute cooperative services requiring the user signature from any device such as a multifunction device.

An example structure of the instruction input device 10 has been described. An instruction input device 10 can be realized by, for example, allowing a device which can execute a program for realizing an information process such as a computer and the multifunction device described above to execute programs which describe various functions described above.

An example structure of the flow controller 20 will now be described. The flow controller 20 corresponds to the first instruction transmission configuration described above (FIG. 3), and is not required in the second instruction transmission configuration (FIG. 4), also described above.

In the flow controller 20, a user management unit 202 manages various information about the user for whom the server 20 provides a service. Information managed by the user management unit 202 includes, for example, verification information used for user verification (such as password and biometrics information) and UI screen information registered by the user. In other words, the systems of the embodiments allow for a user to define a cooperative service unique to the user by allowing the user to combine various services provided by various server devices on the network, and provide from the flow controller 20 an UI screen unique to the user which allows the user to instruct the unique cooperative service.

In this case, when the user (a user may be an individual or a group of people) inputs verification information to the instruction input device 10 and the verification is successful, the instruction input device 10 requests the UI screen of the user to the flow controller 20. In response to this request, the flow controller 20 encrypts the UI screen containing menu of the cooperative service or the like registered by the user using the public key of the user and transmits the encrypted data to the instruction input device 10. When the user selects a desired cooperative service on the UI screen displayed on a display of the instruction input device 10, the selected content is encrypted using the public key of the flow controller 20 and transmitted from the instruction input device 10 to the flow controller 20. When the flow controller 20 receives the selection result, the flow controller 20 encrypts, using the public key of the user, template data of a collective instruction indicating the cooperative service selected by the user and transmits the encrypted data to the instruction input device 10. When the template of the collective instruction includes a parameter that must be input by the user, the instruction input device 10 displays an input screen for the parameter on the UI 102 and asks the user for an input. When a group of parameters are input in this manner, a collective instruction is complete. This collective instruction corresponds to the job flow instruction 50 described earlier. The instruction input device 10 encrypts the completed job flow instruction using the public key of the flow controller 20 and transmits the encrypted data to the flow controller 20.

The process of user registration with the flow controller 20 and the information on the UI screen unique to each user provided from the flow controller 20 to the instruction input device 10 are not described here in detail because these do not directly relate to the concept of the preferred embodiments of the present invention. These are described in, for example, Japanese Patent Applications Nos. 2002-275229, 2002-275230, and 2002-275231, which are commonly assigned to the assignee of the present application, and which are incorporated herein for reference.

In this example, a structure is described wherein information of the UI screen and templates of collective instructions for cooperative services are stored in the flow controller 20 and are provided to the instruction input device 10 as necessary. It is also possible to employ a configuration wherein the UI screen and the templates of the collective instructions are stored in the instruction input device 10.

A job flow controller unit 204 is a functional module for requesting the servers 25 and the instruction input device 10 to execute processes according to the flow defined in the cooperative service for realizing the cooperative service requested by the user. More specifically, a cooperative service is defined as a flow comprising one or more processes provided by servers 25 (these processes are also referred to as a "unit job" hereinafter) and the flow controller 20 requests the unit jobs indicated in the flow definition to the corresponding servers in order. The process result of each server is returned to the flow controller 20 as necessary and is transmitted as the data to be processed in the next unit job to the corresponding server from the flow controller 20. The job flow controller unit 204 executes requests of processes to the servers and multifunction devices and processes to obtain the result of the process in response to these requests.

In some cases, the instruction input device 10 has a processing functionality in addition to an instruction reception function, and can provide this processing functionality for the cooperative service. In this case, the instruction input device 10 regards this processing functionality as one of the application servers 25.

An encryption/decryption processor unit 206 is a functional module for applying an encryption process to data to be transmitted from the flow controller 20 to the network 35 and for decoding received encrypted data, and has a functionality of encryption, decoding, electronic signing, and verification of electronic signature equivalent to those of the encryption/decryption processor unit 108.

The encryption/decryption processor unit 206 stores public keys of devices such as the instruction input device 10 and each server 25 and of users, or has a functionality to obtain these public keys from a certificate authority or the like on the network. When data must be transmitted, the encryption/decryption processor unit 206 applies an encryption process using the public key of the destination device or user.

The encryption/decryption processor unit 206 also has, as one electronic signature-related function, a function to verify an initiator signature 76 for the overall collective instruction 70 transmitted from the instruction input device 10. The encryption/decryption processor unit 206 also has a private key of the flow controller 20 and can attach an electronic signature of the flow controller 20 to data to be transmitted.

A communication controller unit 212 is a functional module for executing various control processes for communication between the flow controller 20 and the other devices on the network 35.

An example configuration of the flow controller 20 has been described. Such a flow controller 20 can be realized by allowing a computer to execute programs describing the above-described various functions.

Next, an application server 25 will be described. An application server 25 comprises an application program 252 for a service provided by the server, a communication controller unit 254 for executing control processes for communication with the other devices on the network 35, and an encryption/decoding processor unit 256 for executing encryption and decoding processes for the communication.

The encryption/decryption processor unit 256 of the server 25 has a function to verify an initiator signature of a collective instruction sent from the flow controller 20 or from another server 25 as described above. When the signature verification is successful, a process requested of the application 252 is executed.

The encryption/decryption processor unit 256 also has a function to encrypt data obtained by the process of the server 25. When such data of processing result is to be transmitted to the flow controller 20 or to another server 25, the encryption/decryption processor unit 256 encrypts the data using the public key of the destination.

The communication controller unit 254 executes a process to transmit a processing result of the application 252 to the flow controller 20 in the first instruction transmission configuration described above (FIG. 3). In the second instruction transmission configuration described above (FIG. 4), the communication controller unit 254 executes the above-described processes for transmitting a collective instruction 60 (and data resulting from the process if necessary) for the server 25 which is to perform the next process in the flow.

In addition, when the instruction input device 10, the server 25, and the star-type system configuration as described above are employed, the flow controller 20 realizes the flow of the cooperative service and applies a process to maintain the confidentiality of the instruction to the servers 25 within the flow.

Although specific embodiments of the invention have been described, it will be understood by those having skill in the art that changes can be made to these specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An information processor for realizing a service by allowing a plurality of job processors, each executing a process according to a process description written in instruction data, to cooperatively operate, the information processor comprising:
   a signature unit for electronically signing a portion of the process description written in the instruction data to be executed by a job processor; and
   a transmission unit for transmitting the instruction data electronically signed by the signature unit to a job processor for executing a process indicated in the process description,
   wherein the information processor is incorporated into at least one of a printer, scanner, facsimile and photocopy apparatus.

2. An information processor according to claim 1, wherein the signature unit attaches an electronic signature of a requestor who requested the service.

3. An information processor according to claim 1, wherein the signature unit attaches an electronic signature of the information processor.

4. An information processor according to claim 3, wherein the information processor is an originating unit issuing the service.

5. An information processor according to claim 3, wherein the information processor is a relaying device for relaying a result of a job process from a job processor to another.

6. An information processor according to claim 1, wherein the signature unit signs data including the process description to be electronically signed and the process descriptions for processes which are to be executed after the target process.

7. An information processor according to claim 1, wherein the signature unit electronically signs each of a plurality of portions that are to be executed by each job processor.

8. An information processor according to claim 1, wherein the signature unit electronically signs a process unit in the process description.

9. A method for processing information executed by a computer for realizing a service by allowing a plurality of job processors for executing a process according to a process description written in instruction data to cooperatively operate with each other, the method comprising the steps of:
   electronically signing a portion of the process description written in the instruction data to be executed by a job processor; and
   transmitting the electronically signed instruction data to a job processor executing a process indicated in the process description,
   wherein the information processor is incorporated into at least one of a printer, scanner, facsimile and photocopy apparatus service.

10. A method according to claim 9, wherein the electronically signing step comprises a step for attaching an electronic signature of a requestor requesting the service.

11. A method according to claim 9, wherein the electronic signing step comprises a step for attaching an electronic signature of the computer.

12. A method according to claim 11, wherein the computer is an originating unit issuing the service.

13. A method according to claim 11, wherein the computer is a relay device relaying a result of a job process from a job processor to another.

14. A method according to claim 9, wherein the electronically signing step comprises a step for signing data including the process description to be electronically signed and the process descriptions for processes which are to be executed after the target process.

15. A method according to claim 9, wherein the electronically signing step comprises a step for individually attaching an electronic signature to each of a plurality of portions which are to be executed by each job processor.

16. A method according to claim 9, wherein in the electronically signing step, a process unit of the process description is electronically signed.

17. An information processor for realizing a service by allowing a plurality of job processors, each executing a process according to a process description written in instruction data, to cooperatively operate, the information processor comprising:

a signature unit for electronically signing a portion of the process description written in the instruction data to be executed by a job processor, and a transmission unit for transmitting the instruction data electronically signed by the signature unit to a job processor for executing a process indicated in the process description, wherein the signature unit comprises:

a first unit for electronically signing each of a plurality of portions, which are to be executed by each job processor, in the process description; and a second unit for electronically signing an overall group of the plurality of portions electronically signed by the first unit, and the transmission unit transmits instruction data electronically signed by the second unit to the job processor.

18. A method for processing information executed by a computer for realizing a service by allowing a plurality of job processors for executing a process according to a process description written in instruction data to cooperatively operate with each other, the method comprising the steps of:

electronically signing a portion of the process description written in the instruction data to be executed by a job processor;

electronically signing each of a plurality of portions, which are to be executed by each job processor, in the process description;

electronically signing an overall group of the plurality of electronically signed portions;

transmitting the electronically signed overall group of the plurality of electronically signed portions to a job processor for executing a process indicated in the process description.

* * * * *